Figure 3A:
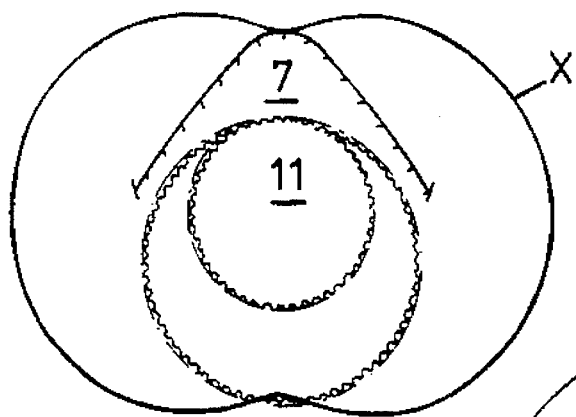

United States Patent [19]

Miller

[11] Patent Number: 5,542,308

[45] Date of Patent: Aug. 6, 1996

[54] CRANK MECHANISM AND MACHINES, ESPECIALLY ENGINES, USING SAME

[76] Inventor: Colin J. Miller, New Haven, Blackmoor Drive, Mawdesley, Lanes L40 2QD, United Kingdom

[21] Appl. No.: 295,836

[22] PCT Filed: Mar. 2, 1993

[86] PCT No.: PCT/GB93/00430

§ 371 Date: Aug. 30, 1994

§ 102(e) Date: Aug. 30, 1994

[87] PCT Pub. No.: WO93/18319

PCT Pub. Date: Sep. 16, 1993

[30] Foreign Application Priority Data

Mar. 7, 1992 [GB] United Kingdom ............... 9205037

[51] Int. Cl.[6] .................. F16H 21/30; F02B 41/04
[52] U.S. Cl. ...................... 74/44; 74/413; 74/437
[58] Field of Search ................. 74/25, 44, 413, 74/437

[56] References Cited

U.S. PATENT DOCUMENTS

| | | | |
|---|---|---|---|
| 2,090,841 | 8/1937 | Jones | 74/44 |
| 2,946,503 | 7/1960 | Thompson | 74/44 |
| 4,044,629 | 8/1977 | Clarke | 74/579 |
| 4,236,416 | 12/1980 | Barcita | 74/44 |
| 4,336,723 | 6/1982 | Barcita | 74/44 |

FOREIGN PATENT DOCUMENTS

| | | | |
|---|---|---|---|
| 615920 | 1/1927 | France . | |
| 2046686 | 3/1971 | France . | |
| 1576241 | 5/1970 | Germany . | |
| 189711 | 6/1937 | Switzerland | 74/44 |
| 231318 | 6/1944 | Switzerland | 74/44 |

Primary Examiner—Charles A. Marmor
Assistant Examiner—David Fenstermacher
Attorney, Agent, or Firm—Seidel, Gonda, Lavorgna & Monaco, P.C.

[57] ABSTRACT

An eccentric crank mechanism which communicates motion between a reciprocating piston and a rotary shaft comprising a crank pin having a connecting rod of the piston concentrically journaled thereon. The crank pin has an eccentric motion profile relative to the axis of the rotary shaft, the eccentric motion profile being controlled by a driving connection between a stator and a rotor which carries the crank pin. The rotary motion of the rotor and the rotary shaft is communicated one to the other by a journaled connection between the rotor and an eccentric journal of the rotary shaft. The driving connection comprises toothed grooving. The profile of the stator and rotor determines the eccentric motion profile.

18 Claims, 3 Drawing Sheets

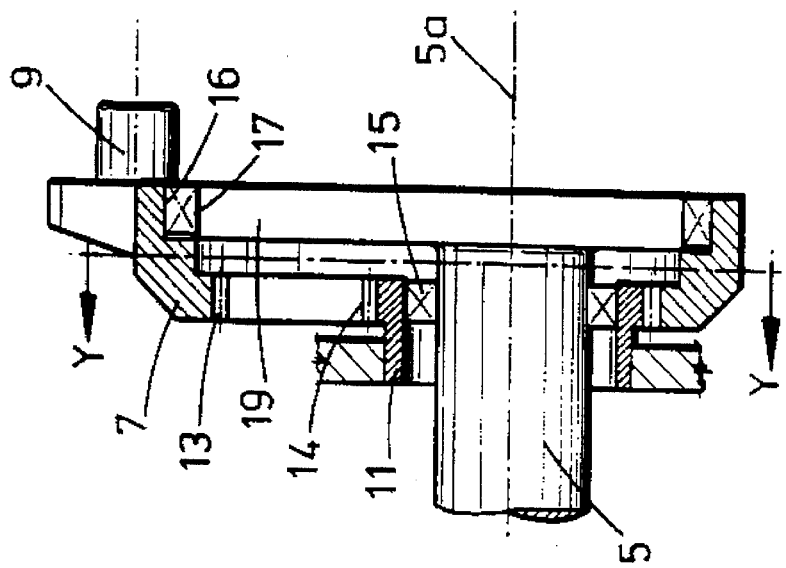
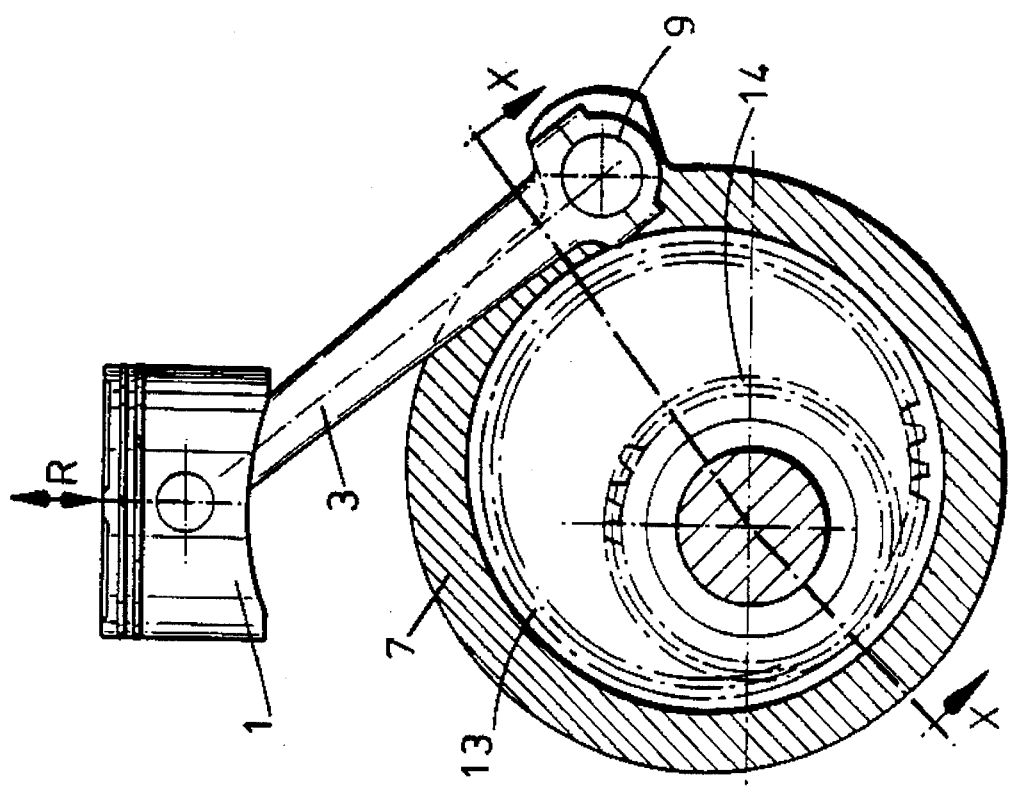
FIG. 1
FIG. 2

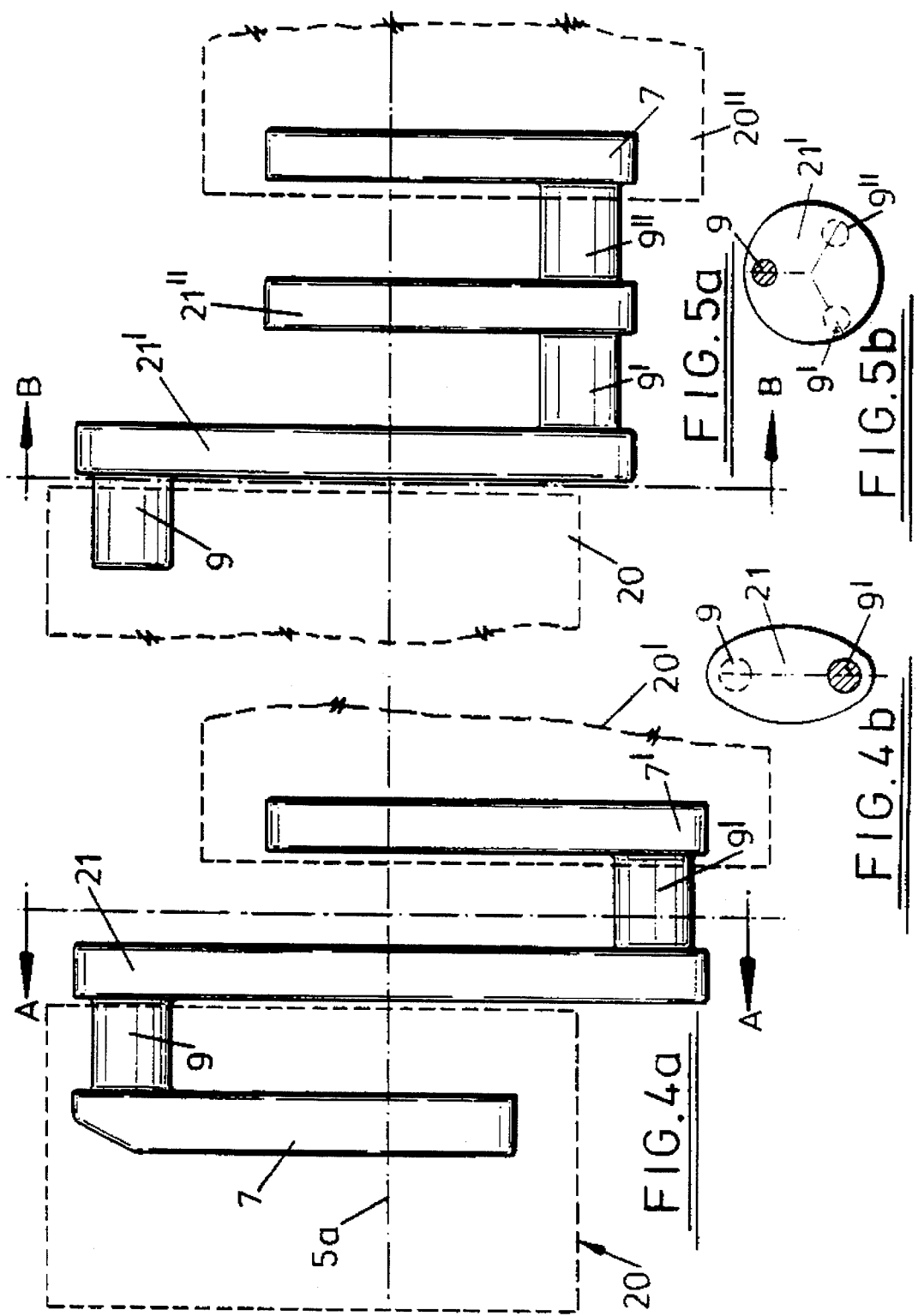

CRANK MECHANISM AND MACHINES, ESPECIALLY ENGINES, USING SAME

DESCRIPTION

The present invention relates to a crank mechanism communicating motion between a reciprocating piston and a rotary shaft and to its application to machines, including all reciprocating prime movers such as heat engines, steam engines, compressors and expanders, which embody linear to rotary motion in their crank mechanisms and with particular application to internal combustion engines.

Reciprocating piston type prime movers have a slidable piston connected to a crank pin of a crank shaft to compress or expand the gas (or other type of fluid) in order to absorb or create energy or convert energy from one form to another. With the existing type of crank mechanism the crank pin rotates concentrically with the axis of the crank shaft and the performance characteristics are inextricably related to the geometric principles of such a crank shaft configuration. Whilst much has been achieved by science and technology to improve the performance characteristics of such prime movers no attention appears to have been given to improving performance by changing the crank mechanism. The present invention when incorporated in such machines aims at achieving radical performance improvements, for example increased thermal efficiency with internal combustion engines, without discarding all that has been achieved to date.

Accordingly, one aspect of the present invention provides a crank mechanism communicating motion between a reciprocating piston and a rotary shaft, comprising a crank pin having journalled thereon a connecting rod of the piston, and wherein the crank pin has an eccentric motion profile relative to the axis of the rotary shaft, the eccentric motion profile being controlled by a driving connection between a stator and a rotor carrying the crank pin, and wherein rotary motion of the rotor and the rotary shaft is communicated one to the other by a journalled connection between the rotor and an eccentric journal of the rotary shaft.

Another aspect of the invention provides a machine incorporating the afore-described crank mechanism. Where the machine is of the type which converts linear to rotary motion, such as an internal combustion engine, the afore-described rotary shaft is an output shaft to which rotary motion is communicated from the rotor by way of the journalled connection. A particular advantage of the use of the described crank mechanism in an internal combustion engine is that it enables the relationship between the thermodynamic cycle and the output torque to be varied. In a conventional engine they cannot be varied in relation to one another. Where the machine is of the type which converts rotary motion to linear motion, the rotary shaft is an input shaft which communicates rotary motion to the rotor by way of the journalled connection.

In converting linear to rotary motion (and vice versa), the eccentric motion profile of the crank pin can exploit various geometric configurations to improve prime mover performance characteristics. Such geometric configurations can embody various combinations of stator/rotor shapes such as a circle rotating on a circle, a circle rotating on a elliptical/parabolic profile, tri-lobed and quad-lobed profiles in various combinations. Furthermore the relative positions of stator and rotor can be off-set in relation to each other for the further fine tuning of performance aspects. Asymmetric configurations are also capable of being exploited. For construction in which the distance of the driving connections of the rotor and stator are variable relative to the rotary shaft axis, a single piece rotary shaft would be expected to be replaced by at least a two-piece construction accommodating relative radial movement between the rotary shaft and its eccentric journal. As a result the relative motion of the piston to the rotary shaft (conventionally the crank shaft) is therefore radically different from all modern day prime movers enabling significant improvements in performance characteristics of the machine to be achieved.

In one embodiment a geared connection is provided between the rotor and the stator by for example an external gear on the stator and an internal gear configuration on the rotor. The rotary shaft is journalled for rotation with respect to the stator.

The crank mechanism has applications to single and multi-cylinder machine configurations.

The present invention will now be described further, by way of example only, with reference to the accompanying drawings, in which:

FIG. 1 is a cross-sectional view on X—X of FIG. 2 showing one embodiment of crank mechanism according to the invention, FIG. 2 is a section on Y—Y of FIG. 1 and including piston and connecting rod detail, FIG. 3a to 3d give examples of the crank pin motion profile for different configurations of rotor and stator, FIG. 4a is a side view of one embodiment of rotor for a multi-cylinder application, FIG. 4b is an end view of the rotor on A—A of FIG. 4a to a reduced scale, FIG. 5a is a side view of an alternative embodiment of rotor for a multi-cylinder application, and FIG. 5b is an end view on B—B of FIG. 5 to a reduced scale.

Referring firstly to FIGS. 1 and 2, the invention is described by way of example with reference to a single cylinder application and illustrates a piston 1 received for reciprocating motion, denoted by double-headed arrow R, in a cylinder bore (not shown). The piston has a connecting rod 3 journalled at one end to the piston and at the other to a crank pin 9. The crank pin is carried by a rotor 7 which in the illustrated embodiment has an internal gear at 13 having a uniform pitch circle diameter and arranged for geared connection with a stator 11 having a mating gear configuration 14 also of constant pitch circle diameter in the illustrated embodiment. Also illustrated is a rotary shaft or crank shaft 5 journalled for rotation about an axis 5a. One bearing for supporting the crank shaft rotatably is shown at 15. Additional bearings may be required. In the illustrated embodiment the pitch circle diameter of teeth 14 is concentric with the axis 5a of the crank shaft. The rotary shaft has an eccentric journal part 19 on which the rotor 7 is journalled by way of bearing 17 which is interposed between the external surface of the eccentric journal 19 and an internal cylindrical surface 16 of the rotor.

The eccentric crank mechanism described above has the effect of modifying the movement profile of the piston compared with the simple harmonic motion which the piston would have if the crank pin moved concentrically with the crank shaft axis. In operation the rotor 7 will move around the stator 11 by virtue of the geared connection 13, 14 producing an eccentricity in the movement of the crank pin 9 instead of the normal circular rotation as with the normal slider crank mechanism. The motion of the rotor is constrained by the connection with the rotary shaft at the journalled connection 17 and since its rotational axis 5a is fixed it serves to control the point at which engagement is made between the gears 13 and 14 during the rotation of the rotary shaft. Whilst the journalled connection 17 determines the relative radial position of the rotor 7 it does not determine its relative circumferential position. This is determined by the geared connection 13, 14 and thus the output shaft can rotate at different speeds to the rotor 7. Typically the output shaft rotates faster than the rotor. The relative speed will depend on the geometric ratios of gears 13 and 14.

In applying the invention to a machine of the type which requires rotary motion to be converted to linear motion, the rotary motion of the rotary shaft is transmitted to the rotor by the journalled connection, whilst the connection of the rotor with the stator prescribes the nature of the linear motion at the piston. Where the invention is applied to a machine of the type which requires linear motion to be converted to rotary motion, such as the internal combustion engine which is the preferred application of the described crank mechanism, the rotary motion of the rotor is transmitted to the rotary shaft by the journalled connection.

FIG. 3a illustrates the crank pin motion profile x for the case of a stator 11 having cylindrical external gearing (ie. of a constant diameter) and mating with a rotor 7 having internal gearing of constant diameter. The loci is the axis of the crank pin for a specific radial and circumferential position relative to the rotor configuration. As has been mentioned above uniform pitch circle diameters of gears 13 or 14 can be replaced by more complex shapes.

Figure 3B:
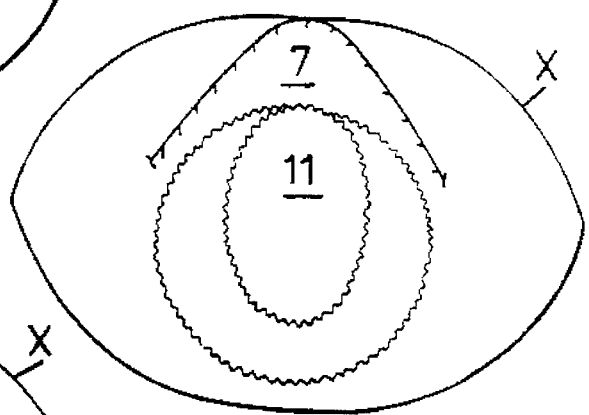
Figure 3C:
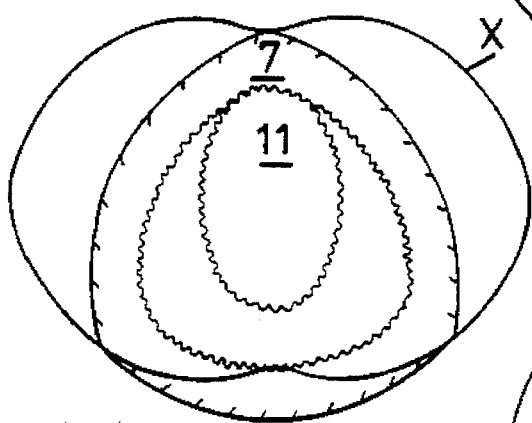
Figure 3D:
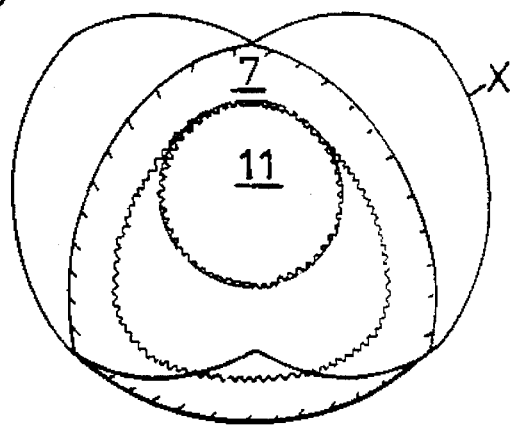

FIGS. 3b, 3c and 3d illustrate the crank pin motion profile x for other configurations of stator 11 and rotor 7. More particularly, FIG. 3b shows a stator having an elliptical configuration mating with a rotor having a cylindrical configuration for the case where the relative position of the stator to the rotor is as shown at say top dead centre of the piston. FIG. 3c illustrates the motion profile for a rotor having an approximately triangular shaped geared chamber rotating on an elliptical stator.

Finally, FIG. 3d shows the triangular shaped gear chamber of FIG. 3c rotating on a quad-lobed stator and the resulting elliptical motion profile. These are examples only and other configurations or combinations could be arrived at to achieve the desired motion profile. In all cases a different motion profile is achieved by changing the point of meshing of the stator and rotor relative to top dead centre. Further changes can be produced by off-setting the rotational axis of the rotor and stator.

FIGS. 4a and 4b illustrate how the crank mechanism of the invention can be utilised in multi-cylinder applications. The illustrated embodiment is for a 2 cylinder 180° configuration, but it could easily be adapted to a flat four. The rectangular dotted outline 20 denotes a construction equivalent to FIG. 1 described previously and only the rotor 7 and crank pin 9 are shown outlined. In order to adapt for multi-cylinders, the rotor is modified to provide an additional crank pin 9' to receive a connecting rod of an associated piston. This crank pin is connected to the existing crank pin by waxy of a crank web 21 and in the illustrated embodiment spaced 180° relative to the axis 5a. Crank pin 9' is shown connected to rotor 7'. Dotted outline 20' which may also be constructed as the equivalent of FIG. 1 but in mirror image, although generally only one rotary shaft is required.

FIGS. 5a and 5b illustrate how the crank mechanism can be applied to a 3 or 6 cylinder embodiment. Again dotted outline 20 represents a construction equivalent to FIG. 1 and in this instance the crank pin 9 connects with a first crank web 21' having crank pin 9' set at 120° from the pin 9 and this connects with a second crank web 21" spaced a further 120°. This crank pin 9" is shown connecting with a rotor-like part 7 and within dotted outline 20" which may correspond to the construction of FIG. 1 but in mirror image. The additional crank pins receive respective connecting rods of associated pistons.

What is claimed is:

1. A machine comprising: a stator; a rotary shaft having an eccentric journal and an axis of rotation; a rotor carried by the eccentric journal of the rotary shaft such that rotary motion is transferred between the rotor and the rotary shaft, the rotor being connected to the stator for communicating a driving force therebetween; a crank pin carried by the rotor, the crank pin having an eccentric motion profile relative to the axis of the rotary shaft when the rotor is driven by the connection between the rotor and stator; a reciprocating piston; and a connecting rod having one end and an other end, the piston being carried on the one end and the other end being concentrically journaled on the crank pin such that motion is communicated between the piston and the rotary shaft.

2. A machine according to claim 1 of the type which converts reciprocally linear motion to rotary motion the rotary shaft being an output shaft to which rotary motion is communicated from the rotor by way of the journaled connection between the rotor and the rotary shaft.

3. A machine according to claim 1 wherein the stator and the rotor each have a circular shape.

4. A machine according to claim 1 of the type which converts rotary motion to linear motion, the rotary shaft being an input shaft which communicates rotary motion to the rotor by way of the journaled connection between the rotor and the rotary shaft.

5. A machine according to claim 1 wherein the driving connection between the rotor and the stator is a toothed gear connection.

6. A machine according to claim 1 wherein the driving connection of at least one of the stator or the rotor is asymmetric.

7. A machine according to claim 1 wherein the eccentric motion profile of the crank-pin has an epi-trochoid trajectory or a hybrid epi-trochoid trajectory.

8. A machine according to claim 1 wherein the relative positions of the stator and the rotor are off-set in relation to each other.

9. A reciprocating piston machine comprising: an annular stator; a rotary shaft having an eccentric journal and an axis of rotation, the rotary shaft being rotatably mounted with respect to the annular stator; an annular rotor rotatably mounted on the eccentric journal and interengaged with the stator for communicating a driving force therebetween; a crank pin disposed on the rotor, the crank pin having an eccentric motion profile relative to the axis of the rotary shaft when the rotor is rotated by the interengagement of the rotor and the stator; a connecting rod having one end and an other end, the other end being concentrically journaled on the crank pin; a reciprocating piston, the piston being carried on the one end of the connecting rod such that motion is communicated between the piston and the rotary shaft.

10. The reciprocating piston machine of claim 9 wherein the rotor has an inner circumferential surface and the stator has an outer circumferential surface, the outer surface of the stator and the inner surface of the rotor being interengaged for transmitting the driving force therebetween.

11. The reciprocating piston machine of claim 10 wherein a plurality of gear teeth are disposed on the inner surface of the rotor and a plurality of gear teeth are disposed on the outer surface of the stator, the gear teeth of the stator being interengaged with the gear teeth of the rotor.

12. The reciprocating piston machine of claim 9 wherein when said driving force is transmitted between the rotor and the stator, and the connection between the rotor and the rotary shaft permit relative rotation therebetween so that the rotor and the rotary shaft are capable of rotating at different speeds.

13. The reciprocating piston machine of claim 9 wherein the stator and the rotor have a cylindrical shape.

14. The reciprocating piston machine of claim 9 wherein the stator has an elliptical or a substantially triangular shape and the rotor has a cylindrical or a substantially triangular shape.

15. The reciprocating piston machine of claim 9 wherein the eccentric motion profile of the crank pin has an epi-trochoid trajectory or a hybrid epi-trochoid trajectory.

16. A machine in the form of an internal combustion engine comprising: a stator; a rotary shaft having an eccentric journal and an axis of rotation; a rotor carried by the eccentric journal of the rotary shaft such that rotary motion is transferred between the rotor and the rotary shaft, the rotor being connected to the stator for communicating a driving force therebetween; a crank pin carried by the rotor, the crank pin having an eccentric motion profile relative to the axis-of the rotary shaft when the rotor is driven by the connection between the rotor and stator; a reciprocating piston; and a connecting rod having one end and an other end, the piston being carried on the one end and the other end being concentrically journaled on the crank pin such that motion is communicated between the piston and the rotary shaft.

17. A machine according to claim 16 which is of the multi-cylinder type.

18. A machine as claimed in claim 17 comprising at least two crank pins.

* * * * *